United States Patent [19]

Grossman

[11] 3,839,056

[45] Oct. 1, 1974

[54] FLUOR-AMPHIBOLE GLASS-CERAMICS

[75] Inventor: David G. Grossman, Painted Post, N.Y.

[73] Assignee: Corning Glass Works, Corning, N.Y.

[22] Filed: Nov. 29, 1972

[21] Appl. No.: 310,374

[52] U.S. Cl............... 106/39.7, 106/39.6, 106/52, 106/54, 106/73.1
[51] Int. Cl......... C03c 3/22, C03c 3/04, C03c 3/30
[58] Field of Search................. 106/39.6, 39.7, 73.1

[56] References Cited
UNITED STATES PATENTS

| | | | |
|---|---|---|---|
| 2,948,629 | 8/1960 | Shell | 106/73.1 |
| 3,054,685 | 9/1962 | Shell | 106/73.1 |
| 3,325,265 | 6/1967 | Stookey | 106/39.6 |
| 3,360,333 | 12/1967 | Ivey | 106/73.1 |
| 3,756,838 | 9/1973 | Beall | 106/39.6 |

OTHER PUBLICATIONS

Takasagawa, N., et al., "Crystallization is Flourrichterite Composition Glass," Chem Abs. Vol. 74, 1971 44939v.
Takasagawa, N. et al., "Microstructure of Flourrichterite Composition Glass–Ceramic Having High Mechanical Strength," Chem. Abs.

*Primary Examiner*—Winston A. Douglas
*Assistant Examiner*—Mark Bell
*Attorney, Agent, or Firm*—Kees van der Steere; Clarence R. Patty, Jr.

[57] ABSTRACT

A family of glass-ceramics containing a significant fraction of fluoramphibole crystals can be formed in the composition system (Li, Na)$_2$O-(Ca, Mg)O-(B,Al)$_2$O$_3$-SiO$_2$-F, through the crystallization in situ of glasses within this system. Fluorrichterite, fluormagnesio-richterite and protoamphibole are readily-formed phases. Long, rod-shaped crystals have been observed by electron microscopy in certain of these materials which are thought to contribute to high mechanical strength and high dielectric breakdown strength.

6 Claims, 2 Drawing Figures

FLUOR-AMPHIBOLE GLASS-CERAMICS

BACKGROUND OF THE INVENTION

Amphiboles are a family of silicate minerals which occur in nature as fibers or fibrous masses. Varieties of amphibole and serpentine are used commerically in producing asbestos materials. Most notably, the variety of serpentine known as chrysotile [$Mg_6Si_4O_{10}(OH)_8$] is extensively used for this purpose. Amphibole asbestos is more resistant to chemical attack and is several hundred degrees more refractory than the serpentine variety. However, amphibole fibers are less flexible than chrysotile and therefore less adaptable to commercial spinning. Amphibole fibers have been used in England for producing fire-protective clothing.

Synthetically-formed amphibole materials, namely fluorine amphiboles, have been a topic for research since the 1950's, after asbestos was classified as a strategic mineral during World War II. A comprehensive review of the structure and synthesis of fluor-amphiboles from melts is given by H. R. Shell, J. E. Comeforo and W. Eitel in "Synthetic Asbestos Investigations," Bureau of Mines Report of Investigations, 5417 (1958).

The general structural formula of the fluor-amphiboles may be given as $W_{0-1} \cdot X_2 \cdot Y_5 \cdot (Z_4O_{11})_2 \cdot F_2$, wherein the coordination of the cations to either oxygen or fluorine is: $W = 12$, $X = 8$, $Y = 6$, and $Z = 4$. W positions are occupied by ions of radius 0.7 to 1.3A, chiefly $Na^{+1}$, $K^{+1}$, $Ca^{+2}$, $Mg^{+2}$ and $Li^{+1}$. X positions are occupied by ions of radius 0.7 to 1.1A, including $Ca^{+2}$, $Na^{+1}$, $Fe^{+2}$, $Mg^{+2}$, $Li^{+1}$ and $Mn^{+2}$. Y positions are occupied by ions of radius 0.5 to 0.9A such as $Mg^{+2}$, $Fe^{+2}$, $Mn^{+2}$, $Fe^{+3}$, $Al^{+3}$, $Li^{+1}$ and $Ti^{+4}$. Z positions are occupied by samll, high valence ions of four-fold coordination, principally $Si^{+4}$ but to a lesser extent (up to about 25%) $Al^{+3}$.

The backbone of the amphibole structure is formed by double silicate chains which are crosslinked alternately by oxygen and fluorine. Each double chain is made up of single chains arranged side by side in a herringbone pattern. The single chains are corsslinked alternately by the X cations in eight-fold coordination and the Y cations in six-fold (octahedral) coordination.

A desirable feature of these fluor-amphibole crystals is their fibrous or needle-like habit. The growth of such crystals in situ in a glass of appropriate composition could produce a fiber-containing glass matrix wherein the fibers would be undamaged and thus extremely strong. Thus, a fiber-reinforced glass-ceramic article of high mechanical strength would be provided.

A glass-ceramic article results from the controlled crystallization in situ of a glass article. Hence, the manufacture of glass-ceramics normally involves three general steps: first, the compounding of a glass-forming batch containing a nucleating or crystallization-promoting agent; second, the melting of the batch to form a homogeneous liquid and the simultaneous cooling and shaping of the melt to form a glass article of the desired dimensions and configuration; and, finally, the heat treatment of the glass article so produced in accordance with a specifically defined time-temperature schedule to develop nuclei in the glass which act as sites for the growth of crystals as the heat treatment proceeds.

Since the crystallization in situ is brought about through an essentially simultaneous crystal growth on countless nuclei, the structure of the glass-ceramic article comprises relatively uniformly-sized crystals homogeneously dispersed in a residual glassy matrix, these crystals constituting the predominant proportion of the article. Thus, glass-ceramic articles are frequently described as being at least 50% crystalline and in numerous instances are actually over 75% crystalline. In view of this very high crystallinity, the chemical and physical properties of glass-ceramic articles are normally materially different from those of the original glass and are more closely related to those demonstrated by the crystal phase. Also, the residual glassy matrix will have a far different composition from that of the parent glass since the components making up the crystal phase will have been precipitated therefrom.

Because a glass-ceramic article is the result of the crystallization in situ of a glass article, conventional glass forming methods such as blowing, casting, drawing, pressing, rolling, spinning, etc. can usually be employed in securing the desired configuration to an article. Also, like glass, a glass-ceramic article is non-porous and free of voids.

U.S. Pat. No. 2,920,971, the basic patent in the field of glass-ceramics, provides an extensive study of the practical aspects and theoretical considerations that must be understood in the manufacture of such articles, as well as a discussion of the crystallization mechanism. Reference is made thereto for further explanation of these matters.

SUMMARY OF THE INVENTION

I have now discovered that glass-ceramic articles consisting essentially of fluor-amphibole crystals dispersed in a residual glassy matrix may be produced from clear to slightly opal glasses over a particularly defined composition area consisting essentially, in weight percent as calculated from the batch, of about 48–75% $SiO_2$, 5–27% MgO, 4–13% $MgF_2$, 0–15% $Al_2O_3$, 0–10% $B_2O_3$, and 3–20% total of one or more oxides selected in the indicated proportion from the group consisting of 0–15% CaO, 4–16% $Na_2O$, and 3–10% $Li_2O$.

In fluor-amphibole crystals produced from these compositions, the W position may be unoccupied but is preferably occupied by $Na^{+1}$ or $Li^{+1}$ ions, the X positions are occupied by $Ca^{+2}$ or $Mg^{+2}$, the Y positions are occupied by $Mg^{+2}$, $B^{+3}$, or $Al^{+3}$, and the Z positions are principally occupied by $Si^{+4}$ but in some instances by $Al^{+3}$. X-ray diffraction examination has shown three distinct types of fluor-amphibole crystals present in the crystallized glass: fluorrichterite structures centered around the formula $Na_2CaMg_5Si_8O_{22}F_2$, fluor-magnesio-richterite structures centered around the formula $Na_2Mg_6Si_8O_{22}F_2$, and lithium-containing proto-amphibole structures centered around the formula $LiMg_{6.5}Si_8O_{22}F_2$. Fluor-magnesio-richterite is a synthetic fluor-amphibole reported by G. V. Gibbs, J. L. Miller and H. R. Shell in "Synthetic Fluor-Magnesio-Richterite," American Mineralogist, Vol. 47, Jan., 1962.

Glass-ceramic articles containing alkali-free crystals of the fluortremolite type ($Ca_2Mg_5Si_8O_{22}F_2$), wherein the W position is vacant, may also be formed, and it is likely that at least some crystals of the fluoredenite ($NaCa_2Mg_5AlSi \cdot O_{22}F_2$) and fluoreckermanite ($Na_3$-

$Mg_4AlSi_8O_{22}F_2$) types are crystallized from glass compositions stoichiometric to these compounds.

Numerous substitutions of other ions into the described crystals may be made with varying results. Thus, $K^{+1}$ may be substituted for $Na^{+1}$, while $Zn^{+2}$, $Cd^{+2}$, $Sr^{+2}$, $Ba^{+2}$ and $Pb^{+2}$ may be substituted for $Ca^{+2}$. Also, $Te^{+4}$, $Sn^{+4}$ and $Ti^{+4}$ may be substituted for $Si^{+4}$, while $Fe^{+2}$, $Mn^{+2}$, $Ni^{+2}$, $Cu^{+2}$, $Co^{+2}$, $Zn^{+2}$, $Cr^{+2}$, P, Sb and V may be substituted for $Mg^{+2}$. In general, however, no special benefit is derived from such substitutions.

While some of the compositions within the scope of the invention crystallize to a rather blocky microstructure comprising crystals of low aspect ratio, electron micrograph studies reveal the presence of unusually long, rod-shaped or fiberlike crystals in certain other of these compositions which are thought to contribute to high mechanical strength. Many of the amphiboles are also characterized by high dielectric breakdown strength in an electric field, a property useful for high voltage applications.

The production of fluor-amphibole glass-ceramics according to the method of the present invention typically comprises melting a batch for a glass consisting essentially, in weight percent, of about 48–75% $SiO_2$, 5–27% MgO, 4–13% $MgF_2$, 0–15% $Al_2O_3$, 0–10% $B_2O_3$, and a total of 3–20% of at least one oxide selected in the indicated proportions from the group consisting of 0–15% CaO, 4–16% $Na_2O$, and 3–10% $Li_2O$, simultaneously cooling the melt at least below the transformation range thereof and shaping a glass article therefrom, and thereafter heating the glass article to a temperature in the range from about 750°–1,000°C. for a period of time sufficient to obtain the desired fluor-amphibole crystallization in situ in the article. The product of this method is a glass-ceramic article containing a major proportion (at least about 50% by volume) of the described fluor-amphibole crystals, although in certain cases minor crystal phases of differing composition and structure may also be present.

The batch for the article may be made up of any constituents, whether oxides or other compounds, which, upon melting to form a glass, will be converted to a composition within the aforementioned range. For example, the required presence of fluorine in the glass-ceramic articles of the invention is expressed and computed for purposes of convenience in terms of a quantity of $MgF_2$, whereas in actuality $MgF_2$ may or may not comprise a batch material and fluorine may be incorporated into the batch using any of the well-known fluoride compounds employed for this purpose in the glass art.

The invention may be further understood by reference to the following detailed description thereof, and to the appended Drawing, wherein FIGS. 1 and 2 are electron photomicrographs showing the crystalline microstructure of two fluor-amphibole containing glass-ceramic articles produced according to the present invention.

DETAILED DESCRIPTION OF THE INVENTION

Figure 1:
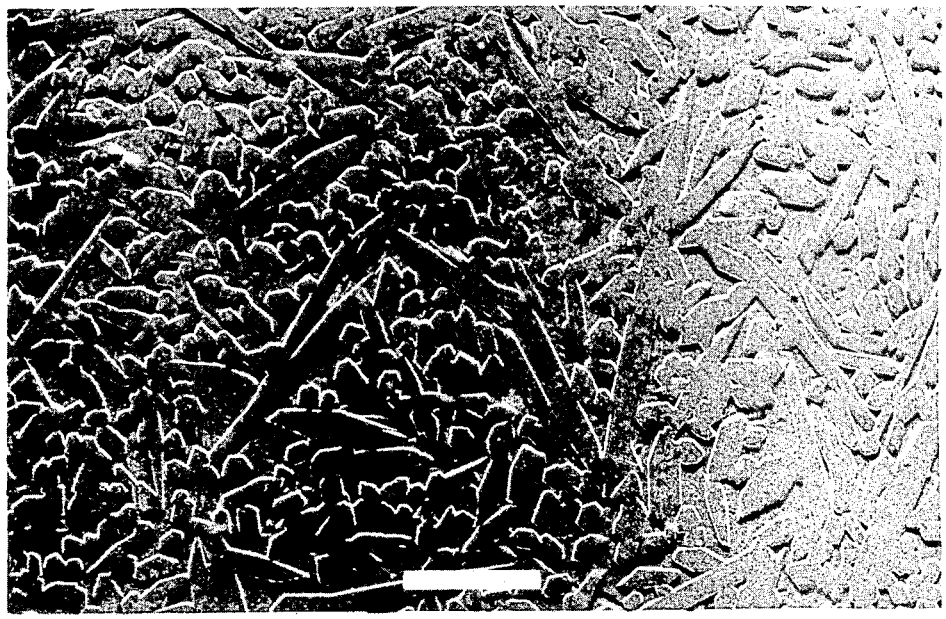

As previously set forth, batch materials for the glass-ceramic compositions of the present invention may comprise any of the compounds known and used in the art for melting glasses. Examples of suitable materials include pure sand, magnesium oxide, magnesium fluoride, pure alumina, anhydrous $B_2O_3$, sodium carbonate and lithium carbonate. Preferably the batches are ball-milled to insure homogeneity, and are then melted in pots, crucibles, tanks or the like, typically at temperatures in the range of about 1,400°–1,500°C. The melts are then formed into glass articles and annealed in the 550°–600°C. temperature range, although where commercially desirable, annealing may be omitted and the formed glass articles immediately subjected to a crystallizing heat treatment. Soda-containing compositions within the scope of the invention typically produce very clear and stable glasses, whereas glasses high in fluorine may be cloudy in appearance. Lithia-containing glasses are generally opalescent, except in the case of major lithia additions or where alumina is present. Fluorine retention in these glasses averages 85–90% of fluorine additions in the case of covered crucible melts.

The incorporation of nucleating agents into the glasses of the invention to promote and control crystallization during heat treatment is not required. Electron micrograph studies suggest that a phase separation which occurs as the glasses are heated to the crystallization range is responsible for the nucleation of the fluor-amphibole crystal phases in these systems. Evidence of crystal growth appears after heating the glass at temperatures as low as about 600°C., and complete crystallization is normally obtained after heating at temperatures near 1,000°C. for 4 hours.

Generally, heat treatments in the temperature range from about 750°–1,000°C. for times in the range from about 2–24 hours are employed. The crystallization process is both time and temperature dependent so that, at lower temperatures, longer treatment times will be required and vice versa. The use of a nucleating step or soaking periods at intermediate temperatures within the described range is not required, although heating rates to maximum temperatures should be limited in order to aviod deformation of the article. A treatment which comprises a hold of at least about 4 hours in the 900°–1,000°C. temperature range is preferred where maximum crystallization of the article is desired.

Table I below lists a number of examples of glass compositions which may be thermally crystallized to fluor-amphibole glass-ceramics according to the present invention. Also listed are the molar compositions of the glasses and the fluor-amphibole crystals most closely related to the molar composition of each glass. Thermal crystallization of these glasses does not in all instances produce the fluor-amphibole phases to which the glasses are most closely related by composition, as will hereinafter more fully appear.

TABLE I

|  | 1 | 2 | 3 | 4 |
|---|---|---|---|---|
| $SiO_2$ | 58.4 | 49.9 | 59.5 | 60.7 |
| MgO | 19.6 | 19.2 | 15.0 | 15.3 |
| $MgF_2$ | 7.6 | 7.4 | 7.7 | 7.9 |
| CaO | 6.8 | 6.7 | — | — |
| $Na_2O$ | 7.5 | 7.4 | 11.5 | 11.7 |

TABLE I—Continued

|  | 1 | 2 | 3 | 4 |
|---|---|---|---|---|
| Li₂O | — | — | — | — |
| Al₂O₃ | — | — | 6.3 | — |
| B₂O₃ | — | — | — | 4.4 |
| TiO₂ | — | 9.5 | — | — |
| Molar Composition Related Fluor-Amphibole Crystal | $Na_2CaMg_5Si_8O_{22}F_2$ fluorichterite | $Na_2CaMg_5Ti_1Si_7O_{22}F_2$ fluorichterite | $Na_3Mg_4AlSi_8O_{22}F_2$ fluoreckermanite | $Na_3Mg_4BSi_8O_{22}F_2$ fluoreckermanite (boron analog) |

|  | 5 | 6 | 7 | 8 |
|---|---|---|---|---|
| SiO₂ | 50.2 | 51.2 | 65.0 | 64.6 |
| MgO | 19.2 | 19.6 | 18.2 | 17.0 |
| MgF₂ | 7.4 | 7.6 | 5.6 | 7.3 |
| CaO | 13.4 | 13.6 | — | — |
| Na₂O | 3.7 | 3.8 | 11.2 | 11.1 |
| Li₂O | — | — | — | — |
| Al₂O₃ | 6.1 | — | — | — |
| B₂O₃ | — | 4.2 | — | — |
| TiO₂ | — | — | — | — |
| Molar Composition Related Fluor-Amphibole Crystal | $NaCa_2Mg_5AlSi_7O_{22}F_2$ fluoredenite | $NaCa_2Mg_5BSi_7O_{22}F_2$ fluoredenite (boron analog) | $Na_4Mg_6Si_{12}O_{31}F_2$ fluor-magnesio-richterite | $Na_4Mg_6Si_{12}O_{30.9}F_{2.2}$ fluor-magnesio-richterite |

|  | 9 | 10 | 11 | 12 |
|---|---|---|---|---|
| SiO₂ | 63.9 | 62.4 | 64.2 | 65.5 |
| MgO | 18.2 | 20.6 | 19.0 | 19.8 |
| MgF₂ | 5.6 | 5.7 | 5.6 | 5.7 |
| CaO | — | — | 11.2 | — |
| Na₂O | 12.3 | 11.3 | — | 9.0 |
| Li₂O | — | — | — | — |
| Al₂O₃ | — | — | — | — |
| B₂O₃ | — | — | — | — |
| TiO₂ | — | — | — | — |
| Molar Composition Related Fluor-Amphibole Crystal | $Na_{4.4}Mg_6Si_{11.8}O_{30.8}F_2$ fluor-magnesio-richterite | $Na_4Mg_{6.6}Si_{11.4}O_{30.4}F_2$ fluor-magnesio-richterite | $Na_4Mg_{6.2}Si_{11.8}O_{30.8}F_2$ fluor-magnesio-richterite | $Na_{3.2}Mg_{6.4}Si_{12}O_{31}F_2$ fluor-magnesio-richterite |

|  | 13 | 14 | 15 | 16 |
|---|---|---|---|---|
| SiO₂ | 62.1 | 63.3 | 52.6 | 49.0 |
| MgO | 26.0 | 15.9 | 17.7 | 12.3 |
| MgF₂ | 8.1 | 8.2 | 6.8 | 6.4 |
| CaO | — | — | 6.1 | 5.7 |
| Na₂O | — | — | — | — |
| Li₂O | 3.9 | 5.9 | — | — |
| Al₂O₃ | — | 6.7 | — | 10.4 |
| B₂O₃ | — | — | — | — |
| BaO | — | — | 16.8 | — |
| Fe₂O₃ | — | — | — | 16.3 |
| Molar Composition Related Fluor-Amphibole Crystal | $Li_2Mg_6Si_8O_{22}F_2$ proto-amphibole | $Li_3Mg_4AlSi_8O_{22}F_2$ proto-amphibole | $BaCaMg_5Si_8O_{22}F_2$ fluortremolite | $CaMg_4Fe_2Al_2Si_8O_{26}F_2$ fluorhornblende |

The above compositions illustrate that fluor-amphibole glass-ceramics may be prepared over a rather wide range of composition in the (Li, Na)₂O-(Ca, Mg)O-(B, Al)₂O₃-SiO₂-F system. The exact fluor-amphibole crystal phase present in each material depends in part on the composition of the base glass. Thus fluorichterite ($Na_2CaMg_5Si_8O_{22}F_2$) and fluoredenite ($NaCa_2Mg_5AlSi_7O_{22}F_2$) phases may be produced from glasses within the above-described composition area which contain 3–15% CaO, 4–16% Na₂O, a total of 7–20% CaO + Na₂O, and no lithia, while fluor-magnesio-richterite ($Na_2Mg_6Si_8O_{22}F_2$) and fluoreckermanite ($Na_3Mg_4AlSi_8O_{22}F_2$) phases are expected upon controlled crystallization of glasses within the above-described composition area containing 4–16% Na₂O, no lithia and no lime.

Precise identification of the desired crystal phases in all cases may be extremely difficult. For example, it is hard to distinguish fluorrichterite, fluoreckermanite and fluoredenite crystals by X-ray diffraction analysis of these materials because of the close similarities in the unit cell dimensions of these crystals. Thus in many cases specific identification of crystal phases present must be made on the basis of composition rather than on positive X-ray determinations, and even then identification may be uncertain because the composition of the base glass does not completely determine the composition of the fluor-amphibole phase which crystallizes therefrom.

Table II below lists crystal phases, visual characteristics and strengths where determined on individual samples for glass-ceramic articles produced by controlling crystallization of the glass compositions shown in Table I. The presence of minor secondary phases appearing in combination with the major fluor-amphibole phases is reported where identification has been made. Strength values are modulus of rupture determinations in pounds per square inch of cross-sectional area as measured on abraded bar samples. All of the glass-ceramic articles shown in Table II were crystallized according to a heat treatment schedule comprising heating to 800°C. at about 200°C. per hour, holding at 800°C. for four hours, heating to 1,000°C. at 200°C./hour, holding at 1,000°C. for 4 hours, and finally cooling to room temperature.

TABLE II

|  | 1 | 2 | 3 | 4 |
|---|---|---|---|---|
| Major Fluor-Amphibole Phase | fluorrichterite ($Na_2CaMg_5Si_8O_{22}F_2$) | fluorrichterite ($Na_2CaMg_5Si_8O_{22}F_2$) | fluor-magnesio-richterite ($Na_2Mg_6Si_8O_{22}F_2$) | fluor-magnesio-richterite ($Na_2Mg_6Si_8O_{22}F_2$) |
| Secondary Phases | none | none | none | none |
| Visual Description | fine-grained fracture; blocky microstructure | fine-grained fracture; blocky microstructure | fine-grained fracture; small, needle-like crystals | fine-grained fracture; small needle-like crystals |
| Modulus of Rupture (psi) |  | 21,200 | 18,200 | 16,600 |

|  | 5 | 6 | 7 | 8 |
|---|---|---|---|---|
| Major Fluor-Amphibole Phase | fluorrichterite ($Na_2CaMg_5Si_8O_{22}F_2$) | fluorrichterite ($Na_2CaMg_5Si_8O_{22}F_2$) | fluor-magnesio-richterite ($Na_2Mg_6Si_8O_{22}F_2$) | fluor-magnesio-richterite ($Na_2Mg_6Si_8O_{22}F_2$) |
| Secondary Phases | none | none | none | none |
| Visual Description | some deformation; coarse-grained fracture | some deformation; coarse-grained fracture | fine-grained fracture; fiber-like crystals | fine-grained fracture; fiber-like crystals |
| Modulus of Rupture (psi) |  |  | 19,800 | 16,600 |

|  | 9 | 10 | 11 | 12 |
|---|---|---|---|---|
| Major Fluor-Amphibole Phase | fluor-magnesio-richterite ($Na_2Mg_6Si_8O_{22}F_2$) | fluor-magnesio-richterite ($Na_2Mg_6Si_8O_{22}F_2$) | fluor-magnesio-richterite ($Na_2Mg_6Si_8O_{22}F_2$) | fluor-magnesio-richterite ($Na_2Mg_6Si_8O_{22}F_2$) |
| Secondary Phases | none | none | none | none |
| Visual Description | fine-grained fracture; fiber-like crystals | fine-grained fracture; fiber-like crystals | fine-grained fracture; fiber-like crystals | fine-grained fracture; fiber-like crystals |
| Modulus of Rupture (psi) | 19,600 | 24,000 | 20,900 | 20,200 |

|  | 13 | 14 | 15 | 16 |
|---|---|---|---|---|
| Major Fluor-Amphibole Phase | proto-amphibole ($LiMg_{6.5}Si_8O_{22}F_2$) | proto-amphibole ($LiMg_{6.5}Si_8O_{22}F_2$) | fluor-tremolite ($Ca_2Mg_5Si_8O_{22}F_2$) | fluor-tremolite ($Ca_2Mg_5Si_8O_{22}F_2$) |
| Secondary Phases | lithium silicate lithium-magnesium silicate | beta-spodumene | cristobalite | magnetite; cristobalite |
| Visual Description | fine-grained fracture; blocky microstructure | fine-grained fracture; fiber-like crystals | coarse-grained fracture; some deformation | fine-grained fracture |
| Modulus of Rupture (psi) | 9,500 | 20,700 |  | 16,700 |

From the data presented in Table II it can be seen that crystals of the fluorrichterite type ($Na_2CaMg_5Si_8O_{22}F_2$) are readily formed from soda-and lime-containing compositions even in the presence of $B_2O_3$ and/or $Al_2O_3$. Thus, attempts to produce major fluoredenite ($NaCa_2Mg_5AlSi_7O_{22}F_2$) crystal phases or boron analogs thereof ($NaCa_2Mg_5BSi_7O_{22}F_2$) generally produce fluorrichterite bodies, although the presence of minor fluoredenite phases cannot be ruled out in view of the similar X-ray diffraction patterns of fluorrichterite and fluoredenite.

Generally, fluorrichterite bodies are characterized by somewhat blocky crystalline microstructure and good strength. The substitution of minor amounts of acceptable ions for $Na^{+1}$, $Ca^{+2}$, $Mg^{+2}$, $Si^{+4}$, or $F^{-2}$ in the crystal structure of these materials typically does not alter the crystal microstructure. Problems of deformation and coarse grain size may be encountered during the crystallization of articles in the fluoredenite composition area. Therefore compositions consisting essentially, in weight percent as calculated from the batch, of about 48–75% $SiO_2$, 4–13% $MgF_2$, 5–27% MgO, 3–15% CaO, 4–16% $Na_2O$ and 7–20% total of CaO and $Na_2O$ are preferred in the production of fluorrichterite glass-ceramics.

The crystallization of lime-free glasses having compositions related to fluoreckermanite ($Na_3Mg_4AlSi_8O_{22}F_2$) or the boron analog thereof ($Na_3Mg_4BSi_8O_{22}F_2$) typically produces glass-ceramics containing fluor-magnesio-richterite ($Na_2Mg_6Si_8O_{22}F_2$) as the principal crystal phase. The presence of minor amounts of fluoreckermanite crystals in these materials again cannot be ruled out, although the preponderance of fluor-magnesio-richterite crystals suggests that the major proportion of boron and aluminum in these compositions remains in the residual glass rather than being incorporated into the crystal phase. Glass-ceramic articles of this type are characterized by needle-like crystalline microstructure and good body strength.

Compositions in the $Na_2O$-MgO-$SiO_2$-F system which are related to crystals of the fluor-magnesio-richterite type ($Na_2Mg_6Si_8O_{22}F_2$) generally produce glass-ceramics having the most fiberlike crystalline microstructure. The crystals formed in this system are almost invariably of fluor-magnesio-richterite composition, and the glass-ceramic articles produced are highly crystallized and of good strength. Minor amounts of secondary crystal phases such as tridymite and cristobalite may be formed during crystallization of these glass-ceramics, depending upon the composition of the base glass.

Figure 2:
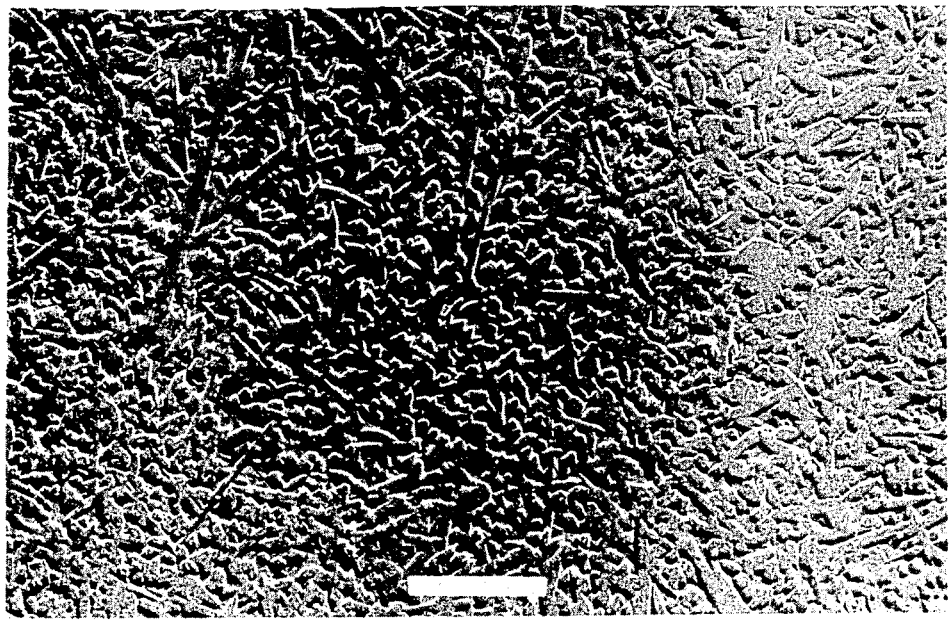

The fiberlike microstructure of these materials is evident in FIGS. 1 and 2 of the drawing, which are electron photomicrographs of the fracture surfaces of glass-ceramic articles of compositions 7 and 8, respectively, shown in the above tables. The white bars in the micrographs represent one micron. The differences in crystalline microstructure between FIGS. 1 and 2 are attributed to the difference in fluorine level between the compositions. The higher fluorine content of composition 8 results in more extensive nucleation and a finer fibrous microstructure than is seen in composition 7.

Compositions which are particularly preferred in the manufacture of fluor-magnesio-richterite glass-ceramics consist essentially, in weight percent as calculated from the batch, of about 48–75% $SiO_2$, 4–13% $MgF_2$, 5–27% MgO, 0–15% $Al_2O_3$, and 4–16% $Na_2O$.

Compositions in the $Li_2O$-MgO-$SiO_2$-F and $Li_2O$-MgO-$Al_2O_3$-$SiO_2$-F systems are useful in the production of glass-ceramics wherein proto-amphibole ($LiMg_{6.}$-

$5Si_8O_{22}F_2$) crystals constitute the principal crystal phase. Other crystal phases formed in minor quantities in these systems include tridymite, $Li_2MgSiO_4$, $Li_2Si_2O_5$ and spodumene. The lithium-containing fluor-amphibole glass-ceramics are particularly valuable from the standpoint of dielectric breakdown strength, with several compositions giving values in the range of about 3,000–4,000 volts/mil. Glass compositions particularly suited for use in the preparation of these proto-amphibole glass-ceramics consist essentially, in weight percent as calculated from the batch, of about 48–75% $SiO_2$, 0–15% $Al_2O_3$, 4–13% $MgF_2$, 5–27% MgO and 3–10% $Li_2O$. Generally, boron-for-aluminum substitutions in these systems produce glasses which are more difficult to form and which crystallize to coarser-grained glass-ceramics than the alumina-containing compositions.

The production of alkali-free fluor-amphibole glass-ceramics of the fluortremolite ($Ca_2Mg_5Si_8O_{22}F_2$) type typically involves difficulties in the area of glass quality, with many compositions being difficult to melt or difficult to form without devitrification. Some deformation on ceramming and coarse microstructure in the finished product are also encountered. As shown by Composition 16 in Table II, fluortremolite crystals may also be obtained from alkali-free glass compositions more closely related to fluor-hornblende than to the fluor-amphiboles. Generally, the presence of some glass-stabilizing agent such as BaO, $Al_2O_3$, $TiO_2$, $SnO_2$, $Fe_2O_3$ or ZnO is required to obtain good glass-ceramics in these alkali-free systems.

Physical properties other than those shown in Table II were determined on certain of the compositions within the scope of the present invention. The article shown as Example 7 of Table II demonstrates a Young's Modulus of about $14.5 \times 10^6$, a Shear Modulus of $6.0 \times 10^6$, and Poisson's Ratio of 0.20. This article has a Knoop hardness of 570, an average coefficient of thermal expansion over the range from room temperature to 800°C. of about $97 \times 10^{-7}$/°C., and a thermal conductivity of 0.00370 cal-cm/cm$^2$-sec-°C. The article is also characterized by a dielectric breakdown strength of 3,000 volts per mil. The acid and alkali durabilities of these compositions are generally good. The physical properties of the other compositions shown in Tables I and II are not expected to differ significantly from the values shown above for Example 7.

From the foregoing description and examples it is apparent that the fluor-amphibole glass-ceramics of the present invention provide physical and electrical properties desirable for a wide variety of electronic and technical applications.

I claim:

1. A glass-ceramic article consisting essentially, in weight percent on the oxide basis as calculated from the batch, of about 48–75% $SiO_2$, 5–27% MgO, 4–13% $MgF_2$, 0–15% $Al_2O_3$, 0–10% $B_2O_3$, and 3–20% total of alkali metal oxides selected in the indicated proportion from the group consisting of 4–16% $Na_2O$ and 3–10% $Li_2O$, a major proportion of the volume of the article being comprised of fluor-amphibole crystal phases selected from the group consisting of fluor-magnesio-richterite, proto-amphibole, and fluoreckermanite.

2. A glass-ceramic article according to claim 1 which is essentially free of lithia and which contains 4–16% $Na_2O$ by weight, a major proportion of the volume of the article being composed of fluor-amphibole crystal phases selected from the group consisting of fluor-magnesio-richterite and fluoreckermanite.

3. A glass-ceramic article according to claim 2 which is essentially free of $Al_2O_3$ and $B_2O_3$, the major proportion of the volume of the article being composed of fluor-magnesio-richterite crystals.

4. A glass-ceramic article according to claim 1 which is essentially free of soda and which contains 3–10% $Li_2O$ by weight, a major proportion of the volume of the article being composed of protoamphibole crystals.

5. A glass-ceramic article according to claim 4 which is essentially free of $B_2O_3$.

6. An alkali-free glass-ceramic article consisting essentially, in weight percent on the oxide basis as calculated from the batch, of 48–75% $SiO_2$, 5–27% MgO, 4–13% $MgF_2$, 0–15% $Al_2O_3$, 0–10% $B_2O_3$ and 3–15% CaO, a major proportion of the volume of the article being composed of fluortremolite crystals.

* * * * *